Jan. 17, 1967 I. W. SANDBERG 3,299,362

RECOVERY OF NONLINEARLY DISTORTED SIGNALS

Filed Sept. 13, 1963 6 Sheets-Sheet 1

INVENTOR
I. W. SANDBERG
BY R. O. Nimz
ATTORNEY

Jan. 17, 1967 I. W. SANDBERG 3,299,362

RECOVERY OF NONLINEARLY DISTORTED SIGNALS

Filed Sept. 13, 1963 6 Sheets-Sheet 3

RECOVERY OF NONLINEARLY DISTORTED SIGNALS

Filed Sept. 13, 1963 6 Sheets-Sheet 4

FIG. 7 ($c=0$)

($\underline{C} \neq 0, \Omega_D = 0$)

($\underline{C} = 0, \Omega_D = 0$)

($\underline{C} \neq 0$, $\underline{D} = 0$)

($\underline{C} = 0$, $\underline{D} = 0$)

3,299,362
Patented Jan. 17, 1967

3,299,362

RECOVERY OF NONLINEARLY DISTORTED SIGNALS

Irwin W. Sandberg, Springfield, N.J., assignor to Bell Telephone Laboratories, Incorporated, New York, N.Y., a corporation of New York Filed Sept. 13, 1963, Ser. No. 308,722
20 Claims. (Cl. 328—163)

This invention relates to distortion producing signal transmission and translation systems and, more particularly, to circuits for the recovery of signals which have been nonlinearly distorted and subsequently band-limited.

In many signal transmission or translation systems, the partial or total failure of components or subsystems results in the introduction of nonlinear distortion into the signals being operated on. The partial failure of an active element such as a transistor, for example, or the malfunctioning of a bias supply, can result in operations which are no longer linear. In many cases, such as submarine cable or satellite repeaters, it is difficult or impossible to make the necessary repairs. It is an object of the present invention to recover undistorted replicas of signals subjected to these types of distortion and thus retain the usefulness of the signal transmission system.

In general, nonlinear operations upon signals produce signal components which are outside of the frequency band of the original signals. If the nature of the nonlinear distortion is known or can be adequately surmised, however, the recovery of an undistorted replica of the original signal can often be fairly easily implemented by means of an inverse nonlinear operation. Many known systems, such as companding systems, operate in this fashion.

As is the usual case with practical transmission systems, however, the system is bandlimiting in that only a finite band of frequencies can be passed by the components of the system or the transmission channel being used. When this is the case, many of the signal components generated by the nonlinear operation are lost and the recovery of the original signal is no longer possible by means of a simple inverse operation. It is known, however, that in certain cases, approximate replicas of the original signal can be recovered from distorted and subsequently bandlimited signals. One such arrangement is disclosed in H. J. Landau Patent 3,022,473, issued February 20, 1962. It should be noted, however, that the recovery arrangement of Landauis suitable only for systems in which the nonlinear distortion arises as a result of a simple, time-invariant frequency independent nonlinear operator. The system of Landau will not recover signals in which the nonlinear operation is paralleled by a frequency sensitive linear operation or in which a frequency sensitive linear operation is included in a feedback path around the nonlinear element.

It is an object of the present invention to remove the distortion in signals subjected to any different types of nonlinear operations and subsequently bandlimited.

It is a more specific object of the invention to iteratively process nonlinearly distorted signals so as to reduce the amount of the distortion by a stable, convergent process.

In accordance with the present invention, a nonlinearly distorted, bandlimited signal is subjected to an iterative process in which the effect of the nonlinear distortion is progressively reduced. In addition, any combined linear, frequency dependent distortion is also removed. Each stage of the iterative recovery circuit includes means for performing an inverse nonlinear operation, specified linear, frequency-dependent operations, and means for combining the results of these operations with separately processed signal components and the output of the previous stage to provide output signals useful in more closely approximating the undistorted input signal.

The advantage of the present invention over previously known recovery schemes is that it permits the recovery of signals distorted by a nonlinear operator imbedded in any type of otherwise linear system. As noted above, previous recovery schemes have been limited to situations in which the nonlinear operation formed a simple cascade with an otherwise linear system, and thus have not been useful in many situations encountered in practice where the nonlinear operation involves a more complex relationship to the rest of the system.

These and other objects and features, the nature of the present invention and its various advantages, will be more readily understood upon consideration of the attached drawings and the following detailed description of the drawings.

Figures 1, 2, 5A, 5B, 5C, 5D, 5E, 5F, 5G:
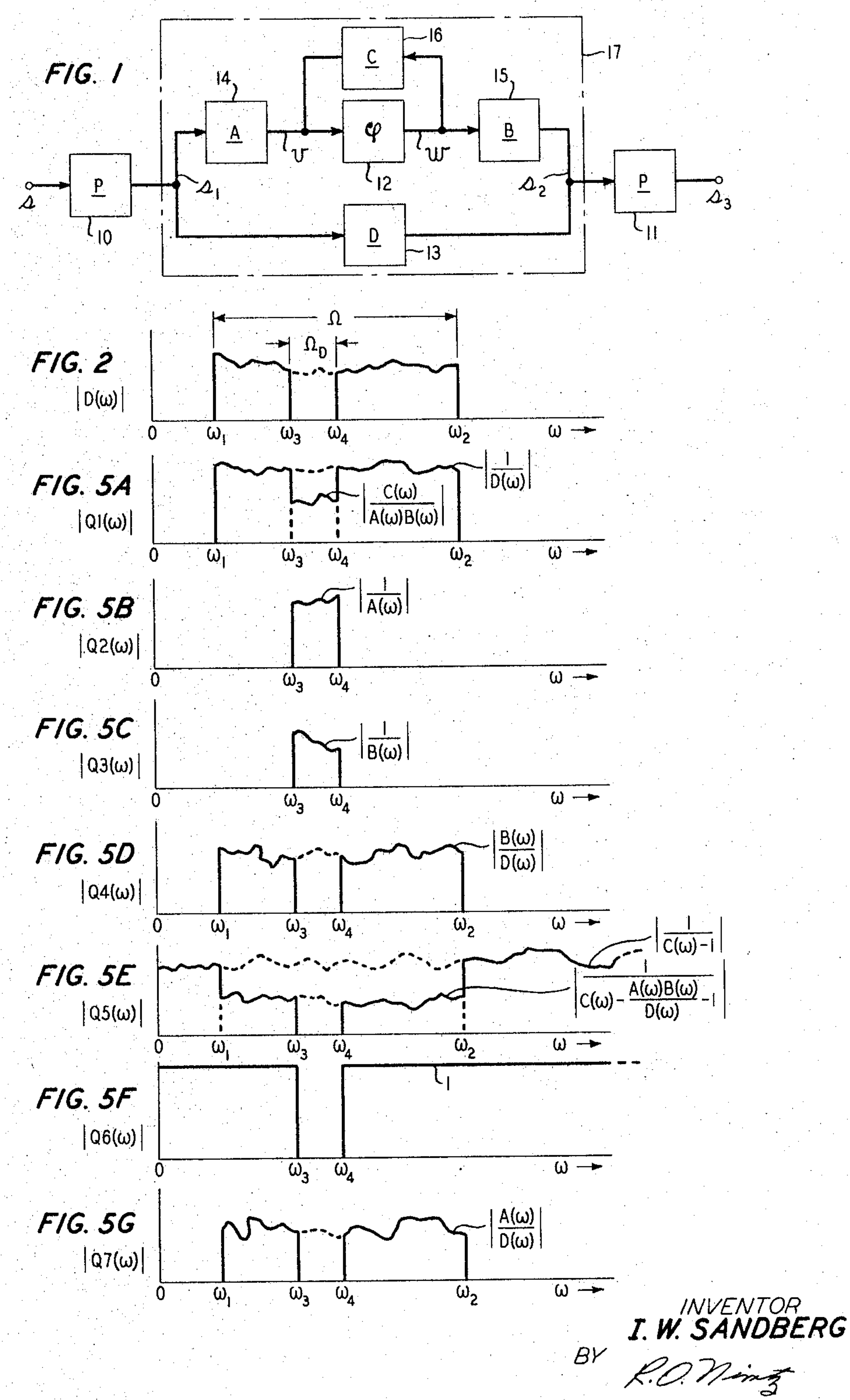
FIG. 1 is a schematic block diagram of a single nonlinear operator embedded in the most general type of otherwise linear systems.
FIG. 2 is a graphical representation of the amplitude versus frequency characteristic of the direct transmission operator in FIG. 1.
FIGS. 5A through 5G are graphical representations of the amplitude versus frequency characteristics of the various operators used in FIGS. 3 and 4.
Figure 6:
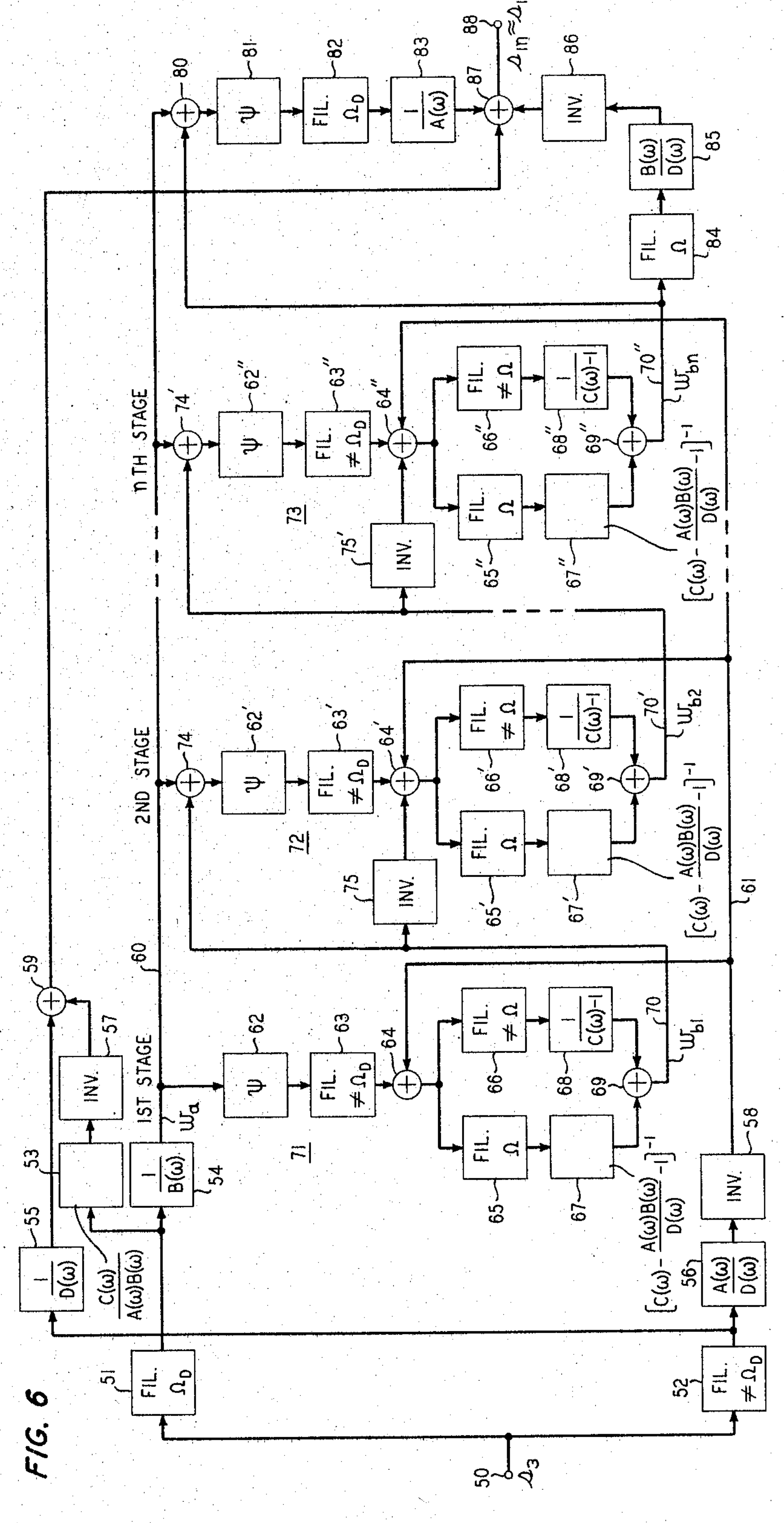
FIG. 6 is a more detailed schematic block diagram of the general recovery scheme illustrated in FIGS. 3 and 4.
Figure 7:
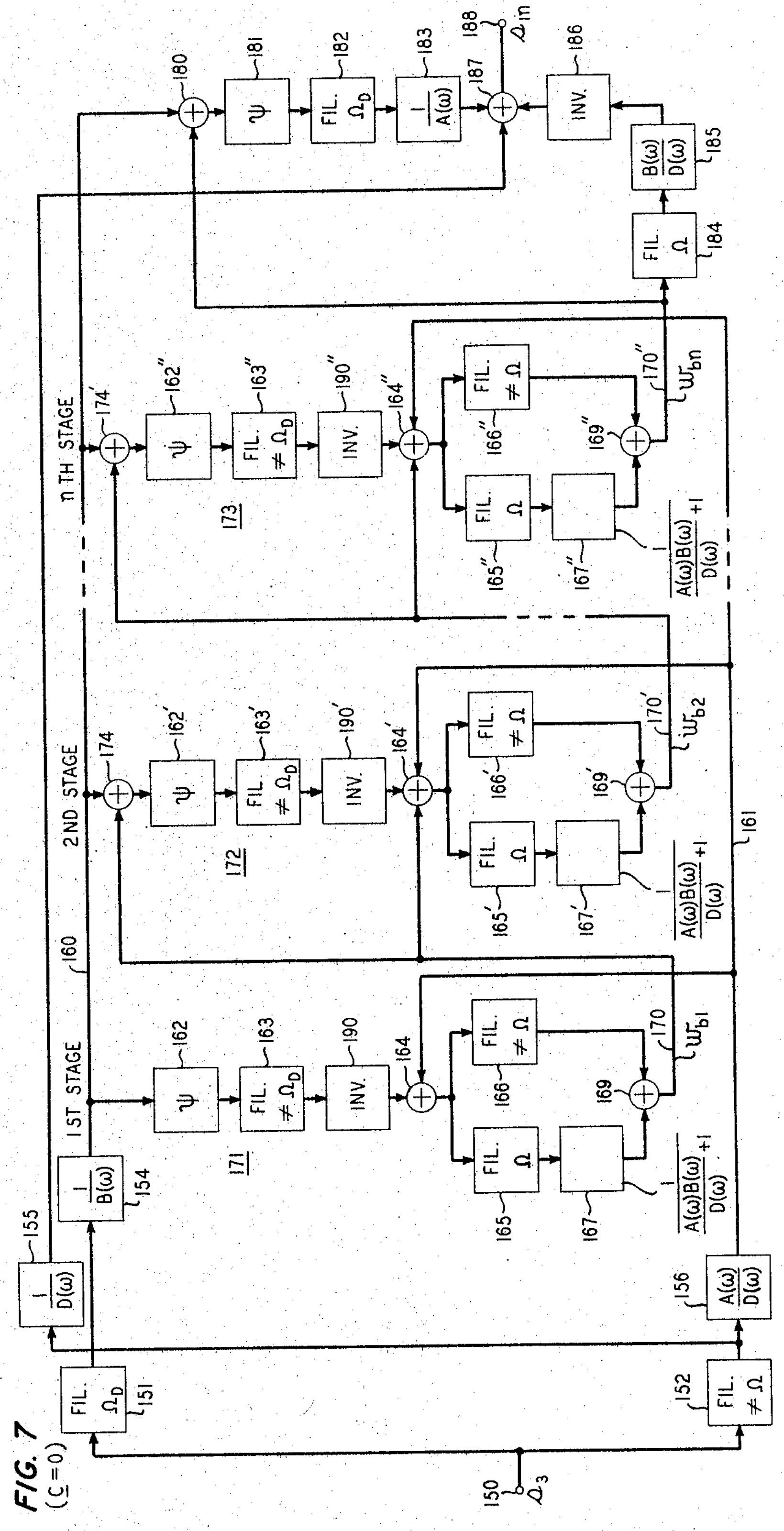
FIG. 7 is a detailed schematic diagram of the recovery scheme under the assumption that there is no feedback transmission around the nonlinear operator in FIG. 1.
Figure 8:
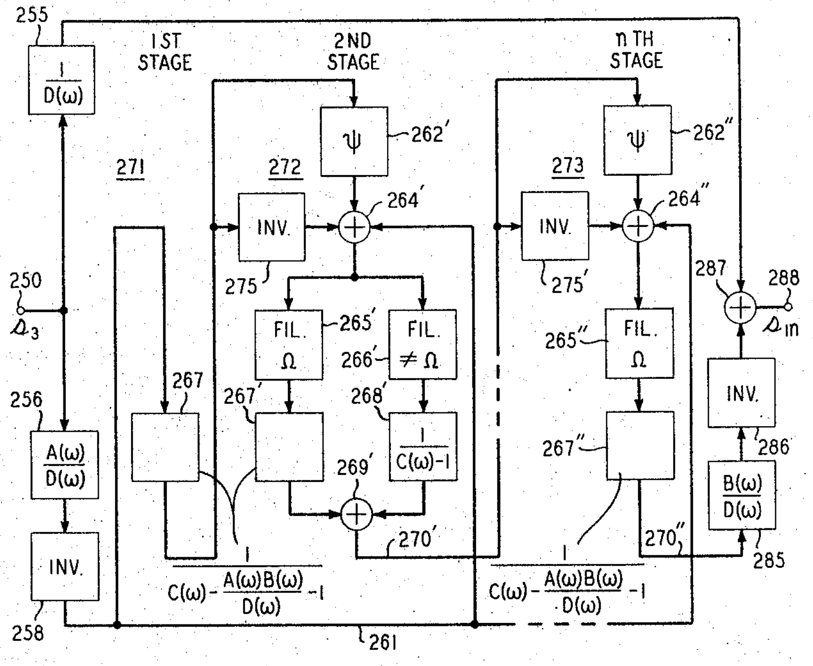
Figure 9:
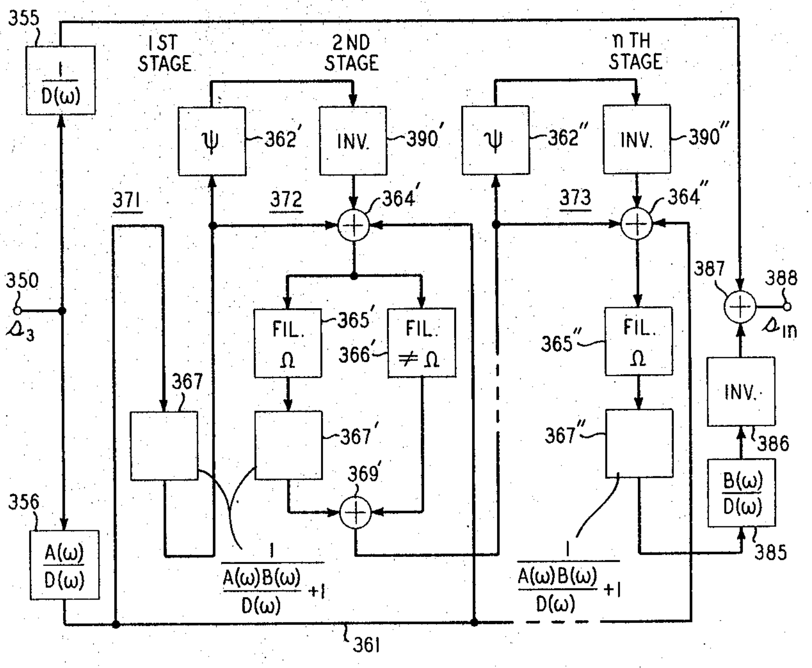
Figure 10:
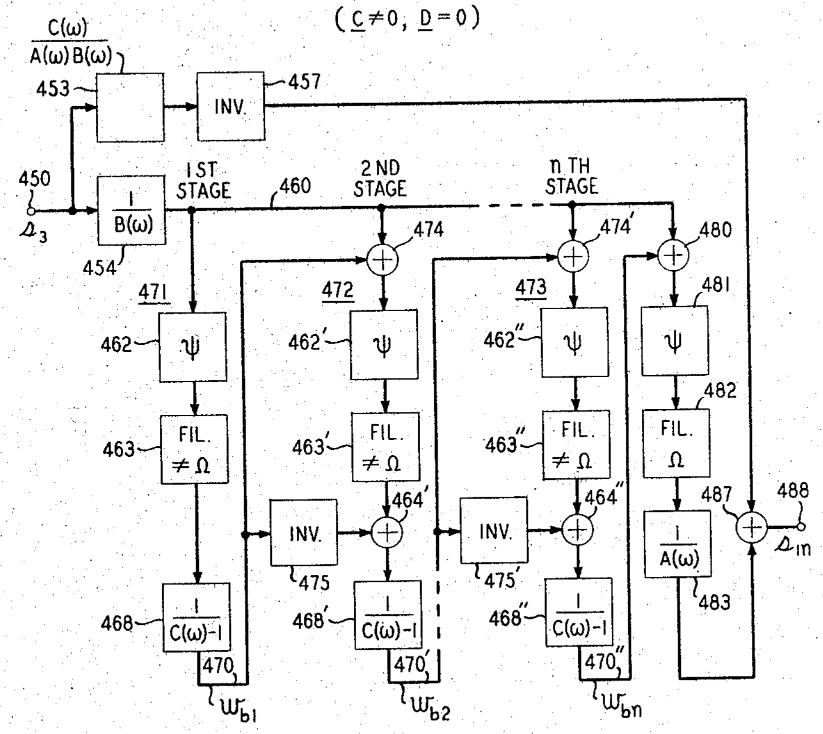
Figure 11:
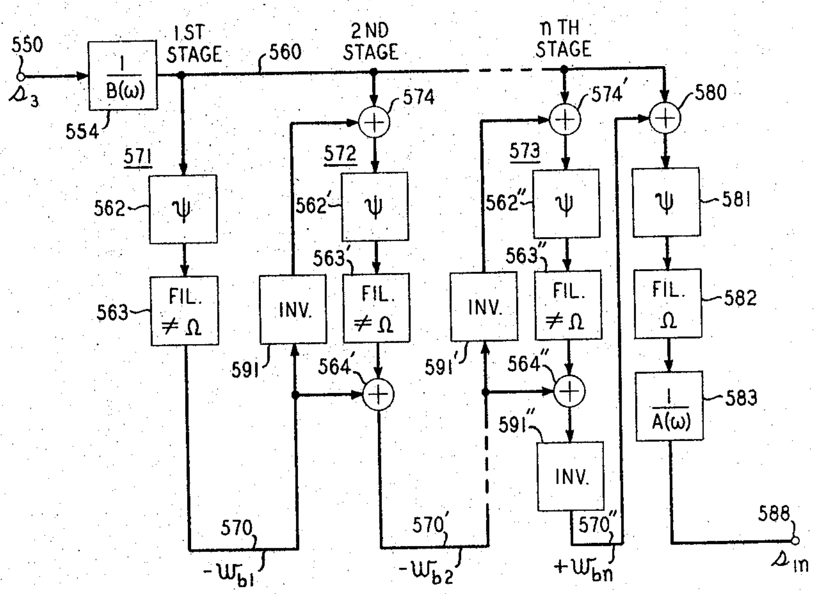

FIGS. 8 and 9 are schematic diagrams of the recovery circuits of FIGS. 6 and 7, respectively, under the simplifying assumption that the direct transmission does not vanish for any frequencies within the band of the original undistorted signal; and FIGS. 10 and 11 are schematic diagrams of the recovery circuits of FIGS. 6 and 7, respectively, under the assumption that there is no direct transmission in the circuit of FIG. 1.

Before proceeding with a detailed description of the drawings, it should be noted that all of the schematic circuit diagrams of the drawings are simple line drawings of the corresponding circuits, and that in an actual circuit, the lines would represent conductor pairs or other suitable signal transmission paths. Moreover, all constant operations, such as amplification and attenuation, have been omitted for simplicity since they do not affect the intelligibility of the signals.

This invention concerns the recovery of band-limited signals (with arbitrary frequency bands) which are distorted by a frequency-selective, time-variable nonlinear operator, and subsequently are bandlimited to the original bands.

A general representation of a nonlinear time-variable element imbedded in an otherwise linear system is shown by dashed box 17 in the block diagram in FIG. 1. The entire system of FIG. 1 further comprises an input bandlimiting operator 10 and an output bandlimiting operator 11. Between these bandlimting operators is the two-port network 17 comprising two parallel paths, one including a time-variable nonlinear operator 12, and the other including only a frequency-selective linear operator 13. In the nonlinear branch of network 17, there also is included a linear frequency-selective input operator 14, a linear frequency-selective output operator 15, and a linear frequency-selective feedback operator 16 around nonlinear operator 12. The equivalent diagram representation shown within box 17 of FIG. 1 is a convenient general representation of a single nonlinear operator imbedded in an otherwise linear system. That is, any two-port network involving a single nonlinearity can be represented in this manner. Actual circuit or system configurations, of course, may vary widely from this equivalent representation, and yet be capable of being completely expressed in this analytical form.

The symbols $\underline{A}$, $\underline{B}$, $\underline{C}$, and $\underline{D}$ in the boxes 14, 15, 16 and 13, respectively, of FIG. 1 represent convolution-type linear operators. That is, in the frequency domain, the output of each block is related to the input to that block by a multiplier which can be symbolically represented by the upper case letter corresponding to the underlined symbol. Each of these multipliers, of course, is complex having an amplitude characteristic variable with frequency as well as a phase characteristic variable frequency. More specifically, $\underline{A}$, $\underline{B}$, $\underline{C}$, and $\underline{D}$ are linear operators defined so that:

$$\begin{aligned} Af(t) &= \int_{-\infty}^{\infty} a(t-\tau)f(\tau)d\tau \\ Bf(t) &= \int_{-\infty}^{\infty} b(t-\tau)f(\tau)d\tau \\ Cf(t) &= \int_{-\infty}^{\infty} c(t-\tau)f(\tau)d\tau \\ Df(t) &= \int_{-\infty}^{\infty} d(t-\tau)f(\tau)d\tau \end{aligned} \qquad (1)$$

for any $f(t)$, where $a(t)$, $b(t)$, $c(t)$ and $d(t)$ are fixed real-valued functions of the independent time variable $t$.

The symbol $\underline{P}$ represents an ideal bandlimiting operation. That is, the block labeled $\underline{P}$ performs the frequency domain operation of multiplying all input signals by a multiplier of unity within its pass band, and by a multiplier of zero outside thereof. To within a time delay, such an operator can be very closely realized by a conventional low pass, bandpass or multiband filter. Indeed, all practical systems are inherently bandlimited in some manner and to some degree due to the non-ideal nature of available components.

The symbol $\varphi$ in block 12 of FIG. 1 represents a nonlinear time-variable operator which operates on input signals to produce output signals not linearly related to the corresponding input signals. That is, if $v$ is the input signal to block 12 and $w$ is the output signal therefrom, the relationship therebetween is $$w=\varphi(v, t) \qquad (2)$$

where $\varphi(v, t)$ is a nonlinear, real-valued function of the real variables $v$ and $t$.

It is assumed that, for the nonlinear function (2), there exists an inverse $\psi[w, t]$ such that $$\psi[\varphi, t]=v \qquad (3)$$

for all values of $v$ and $t$, and that $$\psi(0, t)=0$$

The slope of the nonlinear characteristic satisfies the inequality $$\alpha \leq \frac{\partial\psi(w,t)}{\partial w} \leq \beta \qquad (4)$$

for all $t$, where $\alpha$ and $\beta$ are positive constants. The average $$\frac{(\alpha+\beta)}{2}$$

can be normalized as unity without any loss of generalization, and hence will be so considered hereinafter.

From an observation of FIG. 1, it will be clear that $$v=\underline{A}s_1+\underline{C}w \qquad (5)$$

and $$s_2=\underline{D}s_1+\underline{B}w \qquad (6)$$

Since $$v=\psi[w] \qquad (7)$$

and $$s_3=\underline{P}s_2 \qquad (8)$$

Equations 5 and 6 imply that $$\psi[w]=\underline{A}s_1+\underline{C}w \qquad (9)$$

and $$s_3=\underline{PD}s_1+\underline{PB}w \qquad (10)$$

Since the input to block 13 in FIG. 1 is limited by the bandlimiting operation $\underline{P}$ in block 10, Equation 10 can be simplified by the expression $$\underline{PD}s_1=\underline{D}s_1$$

to $$s_3=\underline{D}s_1+\underline{PB}w \qquad (11)$$

Equations 9 and 11 are basic to the recovery scheme to be considered herein.

In most cases of practical interest, either $D(\omega)\neq 0$ for all $\omega$ within the pass band of $\underline{P}$, or $D(\omega)=0$ for all $\omega$ within the pass band of $\underline{P}$, where $\omega$ is the frequency domain variable ($\omega=2\pi f$, where $f$ is frequency). In order to keep the solution as general as possible, it is convenient to suppose that $\underline{D}$ is such that $D(\omega)=0$ for a range of frequencies in the pass band of $\underline{P}$. In FIG. 2 there is shown a generalized representation of $\underline{D}$ having this property. Thus, in FIG. 2 there is shown a graphical representation of the amplitude of $D(\omega)$ versus frequency $\omega$. For simplicity, it is assumed that $\underline{P}$ has a single pass band $\Omega$, between $\omega_1$ and $\omega_2$, although it is clear that $\Omega$ could be a low-pass band or multiple-pass band just as well.

In accordance with the foregoing assumptions, it is assumed that within the pass band $\Omega$ of $\underline{P}$ there is included a sub-band $\Omega_D$, extending between frequencies $\omega_3$ and $\omega_4$, for which $D(\omega)=0$. It is convenient to divide the frequency band $\Omega$ into the band $\Omega_D$, for which $D(\omega)=0$, and the remainder of the pass band $(\Omega-\Omega_D)$, for which $D(\omega)\neq 0$. As shown in FIG. 2, $|D(\omega)|$ can have an arbitrary shape within $(\Omega-\Omega_D)$.

Operators denoted by a symbol such as $\tilde{\underline{Q}}$ can be defined which operate only on functions vanishing outside of $(\Omega-\Omega_D)$. Thus $\tilde{\underline{D}}^{-1}$ is a perfectly acceptable operation since it specifies nothing concerning operations on signals within the band where $D(\omega)=0$. In fact, $\tilde{\underline{D}}^{-1}$ is that operation by which the original input signal, operated on by $\tilde{\underline{D}}$, is obtained from the results of that operation.

With the above definitions in mind, Equations 9 and 11 can be rewritten so as to take separate account of the operations within the pass band $\Omega_D$ and those outside of this band. Thus, for frequencies within the pass band $\Omega_D$, Equations 9 and 11 imply that $$\underline{P}_D\psi[w]=\underline{AP}_Ds_1+\underline{CP}_Dw \qquad (12)$$

and $$\underline{P}_Ds_3=\underline{P}_D\underline{D}s_1+\underline{P}_D\underline{B}w \qquad (13)$$

where $\underline{P}_D$ is that operator, similar to $\underline{P}$, which passes signals within $\Omega_D$ unaffected (i.e., $P_D(\omega)=1$, $\omega\epsilon\Omega_D$, where the symbol $\epsilon$ means "included within") and prevents transmission of all signals outside of $\Omega_D$ (i.e., $P_D(\omega)=0$, $\omega\epsilon\Omega_D$).

Equation 13 can be further simplified when it is realized that $P_D$ annihilates all signals outside of $\Omega_D$ and D annihilates all signals within $\Omega_D$. Thus the first expression on the right-hand side of Equation 13 can be eliminated to give $$P_D s_3 = P_D B w \quad (14)$$

Similarly, taking into account only those frequencies outside of $\Omega_D$, Equations 9 and 11 imply that $$(I-P_D)\psi[w] = A(P-P_D)s_1 + C(I-P_D)w \quad (15)$$

and $$(P-P_D)s_3 = D(P-P_D)s_1 + P(I-P_D)Bw \quad (16)$$

where $(P-P_D)$ is that operator, similar to P, which passes signals within $\Omega$ but not within $\Omega_D$ and $(I-P_D)$ passes all signals not in $\Omega_D$, I being the identity operator. Since $w$ is not necessarily limited to the frequency band of P, the expression $(I-P_D)$ is necessary in all terms involving $w$.

Equations 12, 14, 15 and 16 can be further simplified if the signal $w$ is divided into frequency portions $w_a$ and $w_b$, where $w_a$ is that portion within $\Omega_D$ and $w_b$ is that portion outside of $\Omega_D$ (i.e., $P_D w = w_a$ and $(I-P_D)w = w_b$). These equations then take the form $$P_D \psi[w_a + w_b] = A P_D s_1 + C w_a \quad (17)$$

$$P_D s_3 = B w_a \quad (18)$$

$$(I-P_D)\psi[w_a + w_b] = A(P-P_D)s_1 + C w_b \quad (19)$$

and $$(P-P_D)s_3 = D(P-P_D)s_1 + (P-P_D)B w_b \quad (20)$$

The recovery of $s_1$ from $s_3$ then devolves into utilizing Equations 17, 18, 19 and 20 to determine $s_1$ in terms of $s_3$.

It will be first noted that $s_1$ can also be divided into that portion within band $\Omega_D$ and that portion outside of $\Omega_D$, and hence within $(\Omega-\Omega_D)$, that is, $$s_1 = P_D s_1 + (P-P_D)s_1 \quad (21)$$

From Equation 17, $$P_D s_1 = \tilde{A}^{-1} P_D \psi[w_a + w_b] - \tilde{A}^{-1} C w_a \quad (22)$$

and from Equation 20, $$(P-P_D)s_1 = \tilde{D}^{-1}(P-P_D)s_3 - \tilde{D}^{-1}(P-P_D)B w_b \quad (23)$$

where $\tilde{A}^{-1}$ is the inverse of the restriction of A to the range $\Omega_D$, and, as described above, $\tilde{D}^{-1}$ is the inverse of the restriction of D to the range $(\Omega-\Omega_D)$.

Substituting Equations 22 and 23 in Equation 21 provides the expression for $s_1$:

$$s_1 = \tilde{A}^{-1} P_D \psi[w_a + w_b] - \tilde{A}^{-1} C w_a + \tilde{D}^{-1}(P-P_D)s_3 - \tilde{D}^{-1}(P-P_D)B w_b \quad (24)$$

From Equation 18, $$w_a = \tilde{B}^{-1} P_D s_3 \quad (25)$$

where $\tilde{B}^{-1}$ has the same significance with respect to B that $\tilde{A}^{-1}$ has with respect to A. Hence Equation 24 becomes $$s_1 = [\tilde{D}^{-1}(P-P_D) - \tilde{A}^{-1} C \tilde{B}^{-1} P_D]s_3 + \tilde{A}^{-1} P_D \psi[\tilde{B}^{-1} P_D s_3 + w_b] - \tilde{D}^{-1}(P-P_D)B w_b \quad (26)$$

The solution is complete if $w_b$ can be evaluated in terms of $s_3$. This can be done as follows:

Substituting Equation 23 into Equation 19 gives $$(I-P_D)\psi[w_a + w_b] = A\tilde{D}^{-1}(P-P_D)s_3 - A\tilde{D}^{-1}(P-P_D)B w_b + C w_b = [C - A\tilde{D}^{-1}(P-P_D)B]w_b + A\tilde{D}^{-1}(P-P_D)s_3 \quad (27)$$

Equation 27 can be reduced to a more useful form by substituting $w_a = \tilde{B}^{-1} P_D s_3$ and subtracting $w_b$ from both sides to provide $$(I-P_D)\{\psi[\tilde{B}^{-1} P_D s_3 + w_b] - w_b\} = [C - A\tilde{D}^{-1}(P-P_D)B - I]w_b + A\tilde{D}^{-1}(P-P_D)s_3 \quad (28)$$

Solving Equation 28 for $w_b$ gives $$w_b = [C - A\tilde{D}^{-1}(P-P_D)B - I]^{-1}(I-P_D)\{\psi[\tilde{B}^{-1} P_D s_3 + w_b] - w_b\} - [C - A\tilde{D}^{-1}(P-P_D)B - I]^{-1} A\tilde{D}^{-1}(P-P_D)s_3 \quad (29)$$

Since $w_b$ can only be expressed in terms of itself, the only method for obtaining $w_b$ from Equation 29 is by means of the method of successive approximations. With the definitions $$J = [C - A\tilde{D}^{-1}(P-P_D)B - I]^{-1} \quad (30)$$

and $$g = A\tilde{D}^{-1}(P-P_D)s_3 \quad (31)$$

the iterative formula for approximating $w_b$ takes the form $$w_{b(i+1)} = J(I-P_D)\{\psi[\tilde{B}^{-1} P_D s_3 + w_{bi}] - w_{bi}\} - Jg \quad (32)$$

For convenience, $w_{bo}$ is taken as zero.

It can be shown that this iteration determines $w_b$ uniquely (within the desired degree of approximation) when $J(\omega)$, the frequency function corresponding to the operator J, satisfies the following inequality:

$$\sup_{\omega \notin \Omega_D} |J(\omega)|(1-\alpha) < 1 \quad (33)$$

where "sup." (supremum) indicates the least upper bound, and $\alpha$ is as defined with respect to inequality (4). As can be seen from the definition of Equation 3, within the band of frequencies included in $\Omega$ but not in $\Omega_D$, i.e., $\omega \epsilon (\Omega-\Omega_D)$, inequality (33) takes the form $$\sup_{\omega \epsilon (\Omega-\Omega_D)} \frac{1}{\left|C - \frac{AB}{D} - 1\right|}(1-\alpha) < 1 \quad (34)$$

and outside of the band $\Omega$, i.e., $\omega \notin \Omega$, takes the form $$\sup_{\omega \notin \Omega} \frac{1}{|C-1|}(1-\alpha) < 1 \quad (35)$$

The factor $(1-\alpha)$ of course, is a measure of the amount of the nonlinearity of operator 12 in FIG. 1. The greater $(1-\alpha)$ is, the greater the nonlinearity, and the smaller $(1-\alpha)$ is, the less the nonlinearity. Since the product $|J|(1-\alpha)$ for $\omega \notin \Omega_D$ must always be less than unity, the least upper bound of $|J|$ for $\omega \notin \Omega_D$ must be smaller when $(1-\alpha)$ is large. This requirement is not absolutely essential to the operation of the present invention, but is a sufficient condition and is satisfied by many cases of engineering interest.

With the approximation of $w_b$ provided by iterative Formula 32, the recovery Equation 26 can be rewritten as $$s_{1n} = [\tilde{D}^{-1}(P-P_D) - \tilde{A}^{-1} C \tilde{B}^{-1} P_D]s_3 + \tilde{A}^{-1} P_D \psi[\tilde{B}^{-1} P_D s_3 + w_{bn}] - \tilde{D}^{-1}(P-P_D)B w_{bn} \quad (36)$$

where $s_{1n}$ and $w_{bn}$ are the $n$th approximations of the desired signal $s_1$ and $w_b$, respectively. Equation 36 takes the form $$s_{1n} = Q1 s_3 + Q2 \psi[Q3 s_3 + w_{bn}] - Q4 w_{bn} \quad (37)$$

where $$Q1 = \tilde{D}^{-1}(P-P_D) - \tilde{A}^{-1} C \tilde{B}^{-1} P_D$$

$$Q2 = \tilde{A}^{-1} P_D$$

$$Q3 = \tilde{B}^{-1} P_D$$

and $$Q4 = \tilde{D}^{-1}(P-P_D)B \quad (38)$$

Similarly, the iterative Formula 32 takes the form $$w_{b(i+1)} = Q5 \cdot Q6\{\psi[Q3 s_3 + w_{bi}] - w_{bi}\} - Q5 \cdot Q7 s_3 \quad (39)$$

where $$\underline{Q5}=\underline{J}=[\underline{C}-\underline{A}\tilde{\underline{D}}^{-1}(\underline{P}-\underline{P}_D)\underline{B}-\underline{I}]^{-1}$$
$$\underline{Q6}=(\underline{I}-\underline{P}_D)$$
$$\underline{Q7}=\underline{A}\tilde{\underline{D}}^{-1}(\underline{P}-\underline{P}_D) \quad (40)$$

and $\underline{Q3}$ is as defined in Equation 38.

Figure 3:
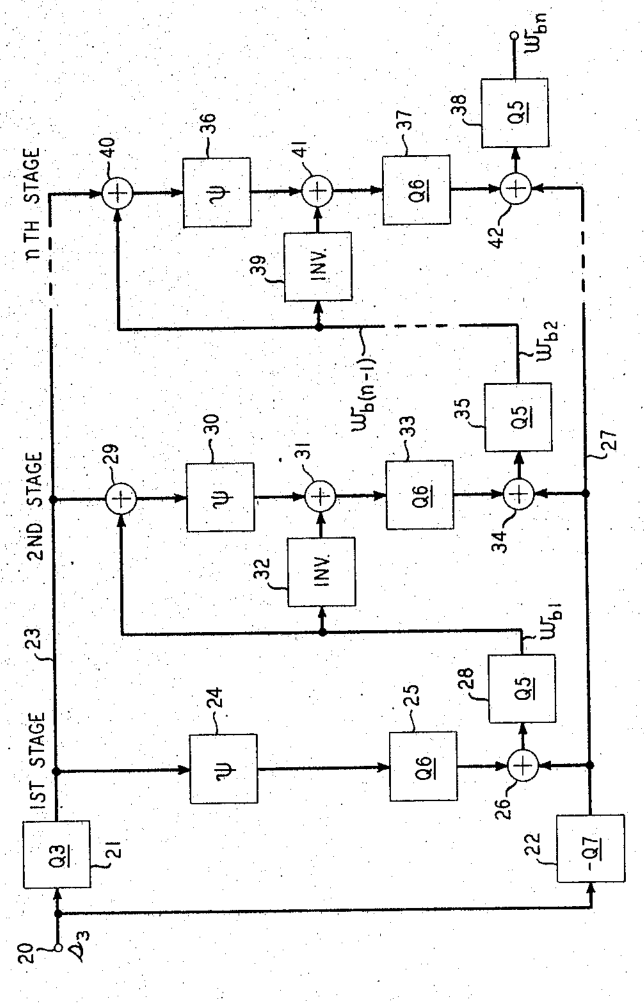
FIG. 3 is a schematic block diagram of an interative network forming a portion of the recovery scheme of the present invention.

A general schematic block diagram of an implementation of the iterative process of Equation 39 is shown in FIG. 3. The block diagram of FIG. 3 comprises an input terminal 20 to which there is applied the output of the circuit of FIG. 1, identified as the signal $s_3$. This signal has been subjected to the nonlinear distortion of the system in box 17 of FIG. 1, and subsequently band-limited by the operator 11, which might comprise a conventional signal transmission system with its inherent band limitations.

The signal $s_3$ appearing at terminal 20 is simultaneously applied to operator 21 in FIG. 3, identified as $\underline{Q3}$, and the operator 22, identified as $-\underline{Q7}$. The output of operator 21 is applied to bus 23 to which there is connected an inverse nonlinear operator 24 as defined by Equation 3. The output of nonlinear operator 24 is applied to operator 25, identified as $\underline{Q6}$, the output of which is applied to summing device 26. The other input to summing device 26 is taken from bus 27, to which the output of operator 22 is applied. Summing device 26 may actually comprise a summing amplifier, a simple resistance summing network, or simply a common node to which the signals are applied, depending on the impedance levels in the actual circuits and the amount of isolation required.

The output of summing device 26 is applied to operator 28, represented by Q5. The output of operator 28 is represented as $w_{b1}$ and represents the output of the first stage of approximation for realizing $w_{bn}$ according to Formula 39.

The second stage of the iterative network of FIG. 3 is identical to the first stage except that the results of the first stage are combined with the operations of the second stage to further reduce the distortion. Thus, signals from bus 23 are supplied to summing device 29 along with the output $w_{b1}$ of the previous stage. The sum of these two signals is applied to nonlinear operator 30, which is identical to operator 24, and then to summing device 31. The output of the previous stage of approximation is inverted in inverter 32 and also applied to summing device 31. Inverter 32 merely inverts the polarity of the signal applied to its input, and may comprise an inverting amplifier, a transformer, or a mere transposition of the pair of conductors.

The output of summing device 31 is applied to operator 33, which is identical to operator 25 and is represented by $\underline{Q6}$. The output of operator 33 is applied to summing device 34 along with signals from bus 27. The sum of these two signals is applied to operator 35, which is identical to operator 28. The output of operator 35 is the second approximation to $w_{bn}$ and is represented as $w_{b2}$.

Following the second stage of approximation of $w_b$, there are that number of additional stages which are required to approximate $w_b$ to the degree of exactness desired. The iteration process converges at a geometric rate and hence only a very few stages may be necessary. In some special cases, only a single stage may be used. Other cases, of course, may require a larger number of stages. All of the stages, however, are identical, and hence are well adapted to modern repetitive manufacturing processes. Indeed, in some cases it may be more desirable to provide a storage medium for the output of the first stage and conduct all processing in the same single stage of circuitry, but at successive times.

The last, or $n$th stage of approximation includes a nonlinear operator 36 ($\psi$), two linear operators 37 and 38 ($\underline{Q6}$ and $\underline{Q5}$, respectively), one inverter 39, and three summing devices 40, 41 and 42, all arranged identically to the second stage. The output of the $n$th or last stage is represented by $w_{bn}$ and represents the solution of Equation 37 to the desired degree of accuracy.

It is to be noted that the block diagram of FIG. 3 does not show any amplifiers which might be required to compensate for the losses in the various circuit components. That is, it is assumed that the various operators can be realized in ideal form, and hence no signal attenuation occurs. In an actual system, of course, signal attenuation will occur and amplification at various points along the iterative network will be necessary.

Similarly, it is assumed in FIG. 3 that the operations can be accomplished without time delay. In an actual system, of course, delays will occur in performing the various operations. In this case, compensating delays must be inserted in busses 23 and 27, between stages. If the nonlinear operator $\psi$ is time variable, this time variation must also be staggered in operators 24, 30, . . . 36 to correspond with the time delays in the other branches of the network.

Figure 4:
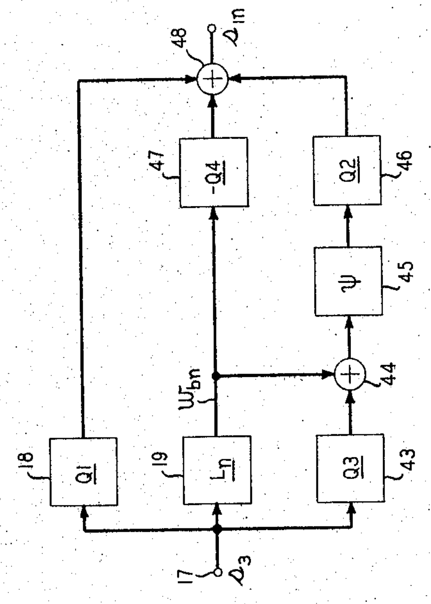
FIG. 4 is a schematic block diagram of the entire recovery scheme of the present invention when implemented with the interative network of FIG. 3.

In FIG. 4 there is shown a general schematic block diagram of the implementation of Equation 37. Like FIG. 3, the output of the circuit of FIG. 1 ($s_3$) is applied to input terminal 17. This signal is simultaneously applied to operators 18, 19 and 43. Operator 18 is represented by $\underline{Q1}$, operator 43 by $\underline{Q3}$, and operator 19 by $\underline{L}_n$, which represents in block form the iterative operation shown in detail in FIG. 3. The output of operator 19 ($w_{bn}$) and the output of operator 43 are applied to summing device 44 and the sum applied to an inverse nonlinear operator 45. Operator 45 is identical to operators 24, 30 and 36 in FIG. 3 and represents an operator ($\psi$) inverse to the nonlinear operation of operator 12 in FIG. 1.

The output of operator 45 is applied to operator 46, represented by $\underline{Q2}$, while the output of operator 19 ($w_{bn}$) is applied to operator 47, represented by $-\underline{Q4}$. The outputs of operators 18, 46 and 47 are all combined in summing device 48 to provide the final output signal, the approximation to the desired signal $s_1$. Thus the signal $s_{1n}$ represents the intelligence signal from which an arbitrary amount of the nonlinear distortion has been removed. This signal can now be used in some utilization device, not shown, such as a signal reproducer, recorder or controlled operation.

The operators $\underline{Q1}$ through $\underline{Q7}$ in FIGS. 3 and 4 are defined by Equations 38 and 40. A graphical representation of these operations is shown in FIGS. 5A through 5G.

In FIGS. 5A through 5G, there are shown graphical representations of the absolute magnitude versus frequency characteristics of operators $\underline{Q1}$ through $\underline{Q7}$. The actual magnitudes shown are entirely arbitrary and have been chosen only for the purposes of illustration. Furthermore, it is to be understood that each of these operators has a corresponding phase versus frequency characteristic which has not been illustrated.

FIG. 5A, for example, shows the amplitude versus frequency characteristic of $\underline{Q1}$, given in Equations 38 as $$\underline{Q1}=\tilde{\underline{D}}^{-1}(\underline{P}-\underline{P}_D)-\tilde{\underline{A}}^{-1}\underline{C}\tilde{\underline{B}}^{-1}\underline{P}_D$$

This equation states that, in the interval $\Omega_D(\underline{P}_D)$, $Q1(\omega)$ has a magnitude given by the magnitude of $$\frac{C(\omega)}{A(\omega)B(\omega)}$$

and in the interval $(\Omega-\Omega_D)$, $Q1(\omega)$ has a magnitude given by the magnitude of $$\frac{1}{D(\omega)}$$

In order to be specific, the function Q1 is defined to be zero in all other frequency ranges. However, its characteristic outside of $\Omega$ is immaterial to the recovery scheme of the present invention.

The remaining operators $\underline{Q2}$ through $\underline{Q7}$ are similarly disclosed in FIGS. 5B through 5G, respectively. It should be noted that $\underline{Q6}$ is a simple band elimination operator for eliminating the frequency band $\Omega_D$ (between $\omega_3$ and $\omega_4$). In addition, only the frequency function corresponding to operator $\underline{Q5}$ is not immaterial outside of the frequency band $\Omega$ (between $\omega_1$ and $\omega_2$) since the inverse non-linear operators $\psi$ will, in general, produce frequency components which are not limited to the band of the input signal.

The signal recovery scheme shown in block form in FIGS. 3 and 4 can be realized in many different forms. Each of the operators can be realized, for example, by a filter having the required frequency pass band characteristic *and* the specified transfer function within the pass band. In most cases, however, it may be more desirable to separate the pass band characteristics from the transfer functions. Examples of this form of realization are shown in the remaining figures.

In FIG. 6 there is shown a more detailed block diagram of the entire recovery scheme shown in general form in FIGS. 3 and 4. The input signal $s_3$, applied to terminal 50, is simultaneously applied to filters 51 and 52. Filter 51 is a bandpass filter which passes the frequency band $\Omega_D$, i.e., the band between $\omega_3$ and $\omega_4$ (FIG. 2). Filter 52 is a band elimination filter and eliminates this same frequency band $\Omega_D$. The output of filter 51 is simultaneously applied to networks 53 and 54, having the frequency characteristics $$\frac{C(\omega)}{A(\omega)B(\omega)}$$

and $$\frac{1}{B(\omega)}$$

respectively. The output of filter 52 is simultaneously applied to networks 55 and 56, having the frequency characteristics $$\frac{1}{D(\omega)}$$

and $$\frac{A(\omega)}{D(\omega)}$$

respectively. The outputs of networks 53 and 56 are inverted in inverters 57 and 58, respectively. The outputs of network 55 and inverter 57 are combined in summing network 59.

It can be seen that networks 51, 52, 53, 55, 57 and 59, taken together, provide the operation $\underline{Q1}$, shown in FIG. 5A. Band limiting to $\Omega$ is not necessary since the input signal $s_3$ is already assumed to be so limited. Likewise, networks 51 and 54, taken together, provide the operation $\underline{Q3}$, and networks 52, 56 and 58 provide the operation $\underline{Q7}$. The output of network 54, which is $w_a$ in Equation 25, is applied to bus 60, while the output of network 58 is applied to bus 61.

In the first iterative stage 71 of the network of FIG. 6, the signal on bus 60 is applied to inverse nonlinear network 62 and thence to band elimination filter 63. Filter 63 removes the frequency band $\Omega_D$ and hence is identical to filter 52. Filter 63, of course, provides the operation $\underline{Q6}$ shown in FIG. 5F.

The output of filter 63 and signals on bus 61 are summed in summing network 64 and this sum is simultaneously applied to filters 65 and 66. Filter 65 is a bandpass filter and passes the band $\Omega$ (between $\omega_1$ and $\omega_2$). Filter 66 is a band elimination filter and eliminates the same band $\Omega$. The output of filter 65 is applied to network 67, having a frequency characteristic $$\frac{1}{C(\omega)-\frac{A(\omega)B(\omega)}{D(\omega)}-1}$$

and the output of filter 66 is applied to the network 68, having a frequency characteristic $$\frac{1}{C(\omega)-1}$$

The outputs of networks 67 and 68 are combined in summing network 69 to form an output lead 70 the first approximation to $w_b$. Networks 65 through 69, taken together, provide the operation $\underline{Q5}$, shown in FIG. 5E. It will be noted that $\underline{Q5}$ need not be specified in the interval $\Omega_D$ because the signals applied to this operator do not include frequency components in $\Omega_D$ due to filters 52 and 63.

The second stage 72 of the network of FIG. 6 is very similar to the first stage 71 except that the output of the first stage on lead 70 is added to the signal on bus 60 in summing circuit 74, and is inverted in inverter 75 and added in summing network 64'. Prime numbers have been used to indicate corresponding networks in the various stages. It can be seen that the second stage 72 and the last stage 73 are identical to each other and identical to the first stage 71 except for the provision for adding in the output of the previous stage.

The output of the last stage 73 ($w_{bn}$), appearing on lead 70'', is added to signals on bus 60 by summing network 80. This sum is applied to inverse nonlinear network 81 identical to networks 62, 62' and 62'', and thence to bandpass filter 82. Filter 82 passes the frequency band $\Omega_D$ and applies it to network 83, having a frequency characteristic $$\frac{1}{A(\omega)}$$

Networks 82 and 83, of course, provide the operation $\underline{Q2}$.

The final approximation to $w_b$, appearing on lead 70'', is also applied to filter 84, having a pass band $\Omega$. The output of filter 84 is applied to network 85, having a frequency characteristic $$\frac{B(\omega)}{D(\omega)}$$

and thence to inverter 86. Networks 84, 85 and 86, taken together, provide the operation $\underline{Q4}$. It is not necessary to eliminate the band $\Omega_D$ in this operation since no signals in this band are present due to filters 52 and 63''.

The outputs of networks 59, 83 and 86 are combined in summing network 87 to provide at terminal 88 the desired signal $s_{1n}$, which is a close approximation of the desired signal $s_1$. Indeed, $s_{1n}$ can be made to approach $s_1$ as closely as desired simply by increasing the number of stages in the recovery network.

In general, it will be noted from FIG. 6 that the recovery scheme involves the separation of the components of $s_3$ that lie in the frequency band $\Omega_D$ from the rest of the distorted input signal. It will be recalled that $\Omega_D$ is that band of frequencies for which the direct transmission $D(\omega)$ is zero. Only a filtered version of the signal component within $\Omega_D$ is subjected to the inverse nonlinear operation of the first stage, and only the frequency components outside of the band $\Omega_D$ thus generated are retained. They are combined with other signals outside of the band $\Omega_D$ and further processed.

In the second stage, the signal components outside of the band $\Omega_D$, resulting from the processing of the first stage, are combined with signal components within the band $\Omega_D$ and again subjected to the inverse nonlinear operation. The signal components within the frequency band $\Omega_D$ are eliminated from the results of this nonlinear operation and further processing occurs. Finally, after the last stage of approximation of $w_b$, signal components within the band $\Omega_D$, and signal components outside of the band $\Omega_D$ are combined to provide the desired approximation. As noted hereinbefore, this recovery scheme will operate with a very general type of single nonlinear distortion embedded in any type of otherwise linear system.

Significant simplifications of the recovery scheme of FIG. 6 are possible if certain simplifying assumptions are made concerning the nature of the distorting system of FIG. 1. As a first example, FIG. 7 shows a block diagram of a recovery scheme which is suitable when there is no feedback transmission 16 around the nonlinear element 12 in FIG. 1 ($\underline{C}=0$).

Referring then to FIG. 7, there is shown a detailed block diagram of a recovery scheme in accordance with the present invention in which the feedback transmission is zero or negligible. With this assumption ($\underline{C}=0$), Equations 37 and 39 take the form $$s_{1n}=\underline{\tilde{D}}^{-1}(\underline{P}-\underline{P}_D)s_3+\underline{\tilde{A}}^{-1}\underline{P}_D\psi[\underline{\tilde{B}}^{-1}\underline{P}_Ds_3+w_{bn}] - \underline{\tilde{D}}^{-1}(\underline{P}-\underline{P}_D)\underline{B}w_{bn} \quad (41)$$

$$w_{b(i+1)}=[\underline{A}\underline{\tilde{D}}^{-1}(\underline{P}-\underline{P}_D)\underline{B}+\underline{I}]^{-1}\underline{A}\underline{\tilde{D}}^{-1}(\underline{P}-\underline{P}_D)s_3 - [\underline{A}\underline{\tilde{D}}^{-1}(\underline{P}-\underline{P}_D)\underline{B}+\underline{I}]^{-1}(\underline{I}-\underline{P}_D) \{\psi[\underline{\tilde{B}}^{-1}\underline{P}_Ds_3+w_{bi}]-w_{bi}\} \quad (42)$$

The implementation of these equations in FIG. 7 can be seen to be very similar to FIG. 6. Except for operations involving the feedback transmission $\underline{C}$, these circuits are identical. Hence, the same reference numerals have been used for corresponding networks with the addition of a prefix "1" in the hundreds digit position to distinguish from FIG. 6.

It will be noted that there is no network corresponding to network 53 in FIG. 6. Likewise, there are no networks corresponding to networks 68, 68' and 68''. Networks 167, 167' and 167'', corresponding to networks 67, 67' and 67'', respectively, in FIG. 1 are simplified in that the frequency characteristic is given by $$\frac{1}{\dfrac{A(\omega)B(\omega)}{D(\omega)}+1}$$

instead of that specified in FIG. 6. Finally, the inverters 190, 190' and 190'' have been repositioned to minimize the number required. In all other respects, however, FIG. 7 is identical to FIG. 6.

It will be recalled that it was assumed that $D(\omega)=0$ for the frequency band $\Omega_D$ only for the purpose of generality. If it is assumed that $D(\omega)$ is never zero in the band $\Omega$ (i.e., $\omega_3=\omega_4$), even further simplifications are possible.

Thus, in FIG. 8 there is shown a schematic block diagram of a recovery circuit in accordance with the present invention for the case in which the direct transmission in FIG. 1 is not zero for any frequency in $\Omega$. It will be noted that the circuit of FIG. 8 assumes that there is a feedback transmission around the nonlinear element (i.e., $\underline{C}\neq0$). Under these assumptions, Equations 37 and 39 become $$s_{1n}=\underline{D}^{-1}s_3-\underline{D}^{-1}\underline{PB}w_{bn} \quad (43)$$

$$w_{b(i+1)}=[\underline{C}-\underline{AD}^{-1}\underline{PB}-\underline{I}]^{-1}\{\psi[w_{bi}]-w_{bi}\} - [\underline{C}-\underline{AD}^{-1}\underline{PB}-\underline{I}]^{-1}\underline{AD}^{-1}s_3 \quad (44)$$

The implementation of these equations in FIG. 8 is considerably less complex than that of FIG. 6. Since the width of the frequnency band $\Omega_D$ is zero, bus 60 is not present and the iterative stages are considerably simplified. Again, the same reference numerals appearing in FIG. 6 have been used in FIG. 8 for corresponding networks to simplify comparisons, but with the addition of the hundreds prefix "2".

The filter networks 51 and 52, connected to input terminal 50 in FIG. 6, are not required in FIG. 8 because (1) the pass band $\Omega_D$ is zero and hence an open circuit, and (2) the elimination of $\Omega_D$ when $\Omega_D$ is zero leaves the original pass band $\Omega$. In the first stage 271, since the original pass band of $s_3$ is already limited to $\Omega$, a filter corresponding to filter 65 in FIG. 6 is not required. The branch in which the band $\Omega$ is eliminated (filter 66 in FIG. 6) is not present since there are no signal components outside of the band $\Omega$. Of course, networks corresponding to inverse nonlinear network 62 and band elimination filter 63 in FIG. 6 are not present, since there is no signal input available within the band $\Omega_D$.

The second stage of approximation, stage 272, and all other intermediate stages between the first and the last, are much more similar to the corresponding stages in FIG. 6. In fact, the only differences are the lack of inputs from a bus similar to bus 60, and the lack of band elimination filters ($\Omega_D$) corresponding to 63, 63' and 63'' in FIG. 6.

The last stage of approximation, stage 273, is also considerably simplified since no use is made of signal components outside of the band $\Omega$ thereafter. For this reason, a filter corresponding to filter 66'', and a network corresponding to network 68'' in FIG. 6, are not present in FIG. 8. Moreover, a filter corresponding to filter 84 in FIG. 6 is not required due to the presence of filter 265''. Of course, the branch including networks 80, 81, 82 and 83 in FIG. 6 is not present because the $\Omega_D$ band-pass filter 82 passes no frequencies, $\Omega_D$ being zero. The frequency characteristics of all networks which are present in FIG. 8 are identical to the characteristics of the corresponding networks in FIG. 6.

If it is further assumed that the feedback transmission is zero ($\underline{C}=0$) as well as that there is no frequency band over which the direct transmission is zero, the circuit configuration shown in FIG. 9 obtains. Under these conditions, Equations 37 and 39 become $$s_{1n}=\underline{D}^{-1}s_3-\underline{D}^{-1}\underline{PB}w_{bn} \quad (45)$$

$$w_{b(i+1)}=[\underline{AD}^{-1}\underline{PB}+\underline{I}]^{-1}\underline{AD}^{-1}s_3 - [\underline{AD}^{-1}\underline{PB}+\underline{I}]^{-1}\{\psi[w_{bi}]-w_{bi}\} \quad (46)$$

It will be seen that the implementation of these equations in FIG. 9 is similar to FIG. 7, but with the absence of the networks involving operations within the band $\Omega_D$. Again, the same reference numerals appearing in FIG. 6 have been used in FIG. 9 for corresponding networks, but with the addition of the hundreds prefix "3," to simplify comparisons.

Like FIG. 8, the filter networks 51 and 52 of FIG. 6 are not required in FIG. 9. Likewise, in the first stage 371, filters 65 and 66 are not required since the band $\Omega$, and only $\Omega$, is present in the input signal. The inverse nonlinear network 62 and filter 63 are not required since there is no input signal to these networks.

The second stage 372, and all other intermediate stages between the first and the last, are identical to the corresponding stages in FIG. 7 except for the absence of inputs from a bus corresponding to bus 160 in FIG. 7, and the lack of band elimination filters corresponding to filters 163, 163' and 163'' in FIG. 7.

The last stage 373 is also considerably simplified, no filter corresponding to filter 166'' in FIG. 7 is present, and filter 385'' takes the place of two filters 165'' and 184 in FIG. 7. The branch including networks 180, 181, 182 and 183 in FIG. 6 is not present due to the lack of band $\Omega_D$. The frequency characteristics of all of the networks which are present in FIG. 9 are identical to the characteristics of the corresponding networks in FIG. 7. In particular, networks 367, 367' and 367'' have a frequency characteristic $$\frac{1}{\dfrac{A(\omega)B(\omega)}{D(\omega)}+1}$$

rather than that of networks 67, 67' and 67'' in FIG. 6.

There is an alternate simplifying assumption which can be made with reference to the recovery circuits of FIGS. 6 and 7 which is of some importance. That is, rather than assuming the frequency characteristic $D(\omega)$ is nowhere zero in the interval $\Omega$, it can be assumed that $D(\omega)$ is everywhere zero in the frequency interval $\Omega$, that is, $\underline{D}=0$. FIGS. 10 and 11 represent recovery schemes under this assumption for the case where $\underline{C}\neq0$ (FIG. 10) and $\underline{C}=0$ (FIG. 11).

In FIG. 10, there is shown a schematic block diagram of a recovery system in accordance with the present invention, where it is assumed that there is no direct transmission bypassing the nonlinear element 12 in FIG. 1. Under this assumption, $\Omega\underline{D}=\Omega$ and Equations 37 and 39 take the form $$s_{1n}=\underline{A}^{-1}\underline{P}\psi[\underline{B}^{-1}s_3+w_{bn}]-\underline{A}^{-1}\underline{C}\underline{B}^{-1}s_3 \quad (47)$$

$$w_{b(i+1)}=[\underline{C}-\underline{I}]^{-1}(\underline{I}-\underline{P})\{\psi[\underline{B}^{-1}s_3+w_{bi}]-w_{bi}\} \quad (48)$$

It will be seen that the implementation of Equations 47 and 48 in FIG. 10 is similar to FIG. 6, but that the lower bus 61 is not present. Filter 52, in eliminating $\Omega_D$, eliminates the entire signal input from input terminal 50 since $\Omega_D=\Omega$ and the input signal $s_3$ is bandlimited to $\Omega$. For ease of comparison, the same reference numerals appearing in FIG. 6 have been used in FIG. 10 for corresponding networks, but with the addition of the hundreds prefix "4."

The filter network 51 is not required in FIG. 10 since $\Omega_D=\Omega$ and the input signal $s_3$ is already limited to the bandwidth $\Omega$. In the first stage 471, the $\Omega_D$ band elimination filter 63 becomes $\Omega$ band elimination filter 463. Since bus 61 is not present, no summing network corresponding to network 64 is required. Since the output of filter 463 is already limited to the band $\Omega$, the branch including networks 65 and 67 disappears and filter 66 is consolidated in filter 463.

The remainder of the stages in FIG. 10 are similar to the first stage, with the addition of combining the results of the previous stage by way of summing networks 474, 474' and 464', 464''.

Since the output of the final stage 473, appearing on lead 470'', includes only signal components outside of the pass band $\Omega$, the branch including networks 84, 85, and 86 in FIG. 6 is not present. Networks 480, 481, 482 and 483 are identical to the corresponding networks in FIG. 6 except that filter 482 passes the band $\Omega$ instead of $\Omega_D$. The frequency characteristics of all of the networks which do appear in FIG. 10 are identical to the characteristics of the corresponding networks in FIG. 6.

Finally, if it is assumed that there is neither direct transmission nor feedback transmission ($\underline{D}=0$, $\underline{C}=0$), the configuration of FIG. 11 results. Under these assumptions, 37 and 39 become $$s_{1n}=\underline{A}^{-1}\underline{P}\Psi[\underline{B}^{-1}s_3+w_{bn}] \quad (49)$$

$$w_{b(i+1)}=-(\underline{I}-\underline{P})\{\Psi[\underline{B}^{-1}s_3+w_{bi}]w_{bi}\} \quad (50)$$

It will be seen that the implementation of these equations in FIG. 11 is a relatively simple, straightforward iterative operation. The only frequency dependent operations remaining on block 17 of FIG. 1 are the input operator 14 and the output operator 15. Likewise, the inverse operators 554 and 583 remain in FIG. 11. Like FIG. 10, the elimination of $\Omega_D$ is the elimination of $\Omega$ and there is no lower bus corresponding to bus 61 in FIG. 6. For ease of comparison, the reference numerals are again retained in the last two positions and the hundreds prefix "5" added.

The filter 51 is not required in FIG. 11 since $\Omega_D=\Omega$ and the input signal is already limited to $\Omega$. The $\Omega_D$ band elimination filters 63, 63' and 63'' in FIG. 6 become band elimination filters 563, 563' and 563'' in FIG. 11. The bandpass filter 65 disappears since no signal components are present outside of band $\Omega$. Filter 66 is consolidated with filter 563. The operation represented by network 68 in FIG. 6 becomes a simple inversion process which is not done until network 591, after providing one input to the summation in summing network 564'.

The remainder of the stages in FIG. 11 are similar to the first stage, with the addition of the summing networks 574, 574' and 564', 564'' for combining the results of the previous stage of approximation.

The output of the last stage 573 on lead 570'' includes only signal components outside of the band $\Omega$, and hence networks corresponding to networks 84, 85 and 86 in FIG. 6 are not required. Networks 580, 581, 582 and 583 are identical to the corresponding networks in FIG. 6 except that filter 582 passes the band $\Omega$ rather than $\Omega_D$.

It will be noted, that with the further assumption that $\underline{A}=\underline{B}=1$ (networks 554 and 583 replaced with direct leads), the circuit of FIG. 11 is a recovery circuit for signals subjected to identically the same type of distortions as that suggested by Landau in his aforementioned patent. It will be further noted, however, that the actual recovery scheme of FIG. 11 is significantly different from that proposed by Landau. In particular, the stages 571, 572 and 573 in FIG. 11 essentially process signals outside of the pass band of the system due to filters 563, 563' and 563''. Signals within the pass band on bus 560 are combined in summing network 580 with the signals outside of the band for separate processing. Landau, on the contrary, eliminates out of band signals after each stage of approximation.

There have been described various circuits for recovering signals subjected to nonlinear distortion and subsequent band limiting. Indeed, the circuits of the present invention provide means for recovering distorted signals generated in any kind of system in which a single, time-variable nonlinearity occurs.

It is to be understood that the above-described arrangements are merely illustrative of the numerous and varied other arrangements which can represent applications of the principles of the invention. Such other arrangements may readily be devised by those skilled in the art without departing from the spirit and scope of this invention.

What is claimed is:

1. In a nonlinear distortion producing signal transmission system having an input signal applied thereto and from which there is derived a corresponding distorted and subsequently bandlimited output signal, means for recovering said input signal from said distorted and bandlimited output signal which comprises, an input frequency separating network for separating frequency bands within said band limitation, a plurality of iterative stages, each stage comprising an inverse nonlinear network, means for eliminating signals from said inverse nonlinear network which fall within one of said separated frequency bands, and means for combining the output of said eliminating means with the output of the previous stage, and an output frequency combining network for combining the output of the last one of said stages and outputs from said input separating network.

2. A signal recovery circuit for recovering undistorted signals from nonlinearly distorted and subsequently bandlimited input signals, wherein said nonlinear distortion is caused by a non-linear element cascaded between first and second serial linear elements, a third linear element is connected in feedback relation to said nonlinear element, and a fourth linear element is connected in parallel with said cascaded linear and nonlinear elements, said signal recovery circuit comprising an input signal processing network including inverse linear operators, a plurality of iterative stages each including an inverse nonlinear operator, and an output signal processing network including an inverse nonlinear operator and inverse linear operators.

3. The signal recovery circuit according to claim 2 wherein said fourth linear element has a frequency characteristic which is substantially zero for a portion of the bandwidth of said input signals, said input network includes means for separating signals within said portion from signal outside of said portion, and each of said stages includes means for eliminating said portion from the results of said inverse nonlinear operation.

4. The signal recovery circuit according to claim 2 wherein said third linear element has a frequency characteristic which is substantially zero for the entire frequency range of said input signals, and said input and output networks include linear operation inverse to only said first, second and fourth linear elements.

5. The signal recovery circuit according to claim 2 wherein said fourth linear element has a frequency characteristic which is nowhere zero for any portion of the bandwidth of said input signals, and said input and output network include only inverse linear operations.

6. The signal recovery circuit according to claim 4 wherein said fourth linear element has a frequency characteristic which is nowhere zero for any portion of the bandwidth of said input signals, and each said stage includes linear operations involving only said first, second and fourth linear elements.

7. The signal recovery circuit according to claim 2 wherein said fourth linear element has a frequency characteristic which is substantially zero for the entire frequency range of said input signals, and each said stage includes means for eliminating signals outside of the frequency range of said input signals.

8. The signal recovery circuit according to claim 4 wherein said fourth linear element has a frequency characteristic which is substantially zero for the entire frequency range of said input signals, said input network comprises an operation inverse to the operation of said second element, and said output network comprises an operation inverse to the operation of said first element.

9. In a nonlinear distortion-producing signal transmission system having an input signal applied thereto and from which there is derived a corresponding but distorted output signal, means for recovery said input signal from said distorted output signal which comprises, a plurality of approximating stages; each of said approximating stages comprising network means simulating the inverse of the nonlinear portion of the characteristic of said system, first means for combining the output of the previous one of said stages and a first portion of the frequency band of said distorted output signal, means for applying said first combined signal to said inverse nonlinear network, means for inverting said previous output, second means for combining said inverted output with the output of said inverse nonlinear network, and means for combining a second portion of the frequency band of said distorted output signal and the output of said second combining means to form the output of that approximating stage; a plurality of means for further limiting the bandwidth of said distorted output signal, and means for combining said limited bandwidth distorted output signals with the output of the last of said approximating stages.

10. A signal translation system comprising a signal distorting circuit including a nonlinear element, linear in put and output networks connected to said nonlinear element; frequency limiting means for passing only restricted frequency ranges of output signals from said signal distorting circuit; and a signal recovery circuit for recovering undistorted signals from said frequency limiting means, said signal recovery circuit comprising inverse input network means having a characteristic involving the inverse of the characteristic of one of said linear networks, a plurality of cascaded iterative stages each including an inverse nonlinear network having a characteristic inverse to that of said nonlinear element and band elimination filter means for eliminating frequency portions of the output of said inverse nonlinear network, and inverse output network means including a further inverse nonlinear network and bandpass filter means.

11. The signal translation system according to claim 10 wherein said signal distorting circuit further includes a linear feedback network around said nonlinear element, each said stage includes network means having a characteristic involving the characteristic of said linear feedback network, and said inverse input network characteristic involves said characteristic of said feedback network.

12. The signal translation system according to claim 10 wherein said signal distorting circuit further includes a linear direct transmission network in parallel with said nonlinear element and said input and output networks, and said inverse input and inverse output networks have characteristics involving the inverse of the characteristic of said direct transmission network.

13. The signal translation system according to claim 12 wherein said direct transmission network characteristic is substantially zero for portions of said restricted frequency ranges, said inverse input network means includes means for separating said portions from the remainder of said restricted frequency ranges, and said band elimination filter means in each said stage eliminates said portions of said restricted frequency ranges.

14. The signal translation system according to claim 10 wherein said nonlinear element includes time-varying means for varying the characteristic of said nonlinear element as a function of time.

15. A signal translation system comprising a signal distorting circuit including a nonlinear element having a nonlinear characteristic $\varphi$, a first linear network having a frequency characteristic $A(\omega)$ connected to the input of said nonlinear element, a second linear network having a frequency characteristic $B(\omega)$ connected to the output of said nonlinear element, a third linear network having a frequency characteristic $C(\omega)$ connected in feedback relation to said nonlinear element, and a fourth linear network having a frequency characteristic $D(\omega)$ connected in parallel with the series connection of said first and second networks and said nonlinear element, the frequency characteristic $D(\omega)$ being zero within a frequency band $\Omega_D$; means for limiting the frequency of signals from said signal distorting circuit to a frequency band $\Omega$ including $\Omega_D$; and signal recovery means comprising first network means for limited frequency signals from said distorting circuit and having a frequency characteristic $[B(\omega)]^{-1}$ within the frequency band $\Omega_D$, second network means for limited frequency signals from said distorting circuit and having a frequency characteristic $A(\omega)[D(\omega)]^{-1}$ outside of the frequency band $\Omega_D$, a plurality of iterative stages each comprising an inverse nonlinear network having a nonlinear characteristic $\psi$ inverse to said nonlinear characteristic $\varphi$, first combining means for combining the output of said first network means with the output of the next previous stage, if any, and applying the combination to said inverse nonlinear network, means for eliminating the frequency range $\Omega_D$ from the output of said inverse nonlinear network, second combining means for combining the output of said second network means, the output of the next previous stage, if any, and the frequency limited output of said inverse nonlinear network, and third network means connected to the output of said second combining means and having a frequency characteristic $$\{C(\omega)-A(\omega)[D(\omega)]^{-1}B(\omega)-1\}^{-1}$$

within the frequency band $\Omega$ and a frequency characteristic $[C(\omega)-1]^{-1}$ outside of the frequency band $\Omega$, the output of said third network means comprising the output of that stage; a further inverse nonlinear network having a nonlinear characteristic $\psi$ inverse to said nonlinear characteristic $\varphi$; third combining means for combining means for combining the output of said first network means with the output of the last stage and applying the combination to said further inverse nonlinear network; means for limiting the frequency range of the output of said further inverse nonlinear network to the frequency range $\Omega_D$; fourth network means for limited frequency signal from said further inverse nonlinear network and having a frequency characteristic $[A(\omega)]^{-1}$; fifth network means for frequency limited signals from said distorting circuit and having a frequency characteristic $[A(\omega)]^{-1}C(\omega)[B(\omega)]^{-1}$ within the frequency band $\Omega_D$ and a frequency characteristic $[D(\omega)]^{-1}$ outside of the frequency band $\Omega_D$; sixth network means connected to the output of said last stage and having a frequency characteristic $B(\omega)[D(\omega)]^{-1}$ within the frequency band $\Omega_D$; and fourth combining means for combining the outputs of said fourth, fifth and sixth network means.

16. A signal translation system comprising a signal distorting circuit including a nonlinear element having a nonlinear, time-varying characteristic $\varphi$, a first linear network having a frequency characteristic $A(\omega)$ connected to the input of said nonlinear element, a second linear network having a frequency characteristic $B(\omega)$ connected to the output of said nonlinear element, and a third linear network having a frequency characteristic $D(\omega)$ connected in parallel with the series connection of said first and second networks and said nonlinear element, the frequency characteristic $D(\omega)$ being zero within a frequency band $\Omega_D$; means for limiting the frequency of signals from said signal distorting circuit to a frequency band $\Omega$ including $\Omega_D$; and signal recovering means comprising first network means for limited frequency signals from said distorting circuit and having a frequency characteristic $[B(\omega)]^{-1}$ within the frequency band $\Omega_D$, second network means for limited frequency signals from said distorting circuit and having a frequency characteristic $A(\omega)[D(\omega)]^{-1}$ outside of the frequency band $\Omega_D$, a plurality of iterative stages each comprising an inverse nonlinear network having a nonlinear characteristic $\psi$ inverse to said nonlinear characteristic $\varphi$, first combining means for combining the output of said first network means with, the output of the next previous stage, if any, and applying the combination to said inverse nonlinear network, means for eliminating the frequency range $\Omega_D$ from the output of said inverse nonlinear network, second combining means for combining the output of said second network means, the output of the next previous stage, if any, and the frequency limited output of said inverse nonlinear network, and third network means connected to the output of said second combining means and having a frequency characteristic $\{A(\omega)[D(\omega)]^{-1}B(\omega)+1\}^{-1}$ within the frequency band $\Omega$, the output of said third network means comprising the output of that stage; a further inverse nonlinear network having a nonlinear characteristic $\psi$ inverse to said nonlinear characteristic $\varphi$; third combining means for combining the output of said first network means with the output of the last stage and applying the combination to said further inverse nonlinear network; means for limiting the frequency range of the output of said further inverse nonlinear network to the frequency range $\Omega_D$; fourth network means for limited frequency signals from said further inverse nonlinear network and having a frequency characteristic $[A(\omega)]^{-1}$; fifth network means for frequency limited signals from said distorting circuit and having a frequency characteristic $[D(\omega)]^{-1}$ outside of the frequency band $\Omega_D$; sixth network means connected to the output of said last stage and having a frequency characteristic $B(\omega)[D(\omega)]^{-1}$ with the frequency band $\Omega$; and fourth combining means for combining the outputs of said fourth, fifth and sixth network means.

17. A signal translation system comprising a signal distorting circuit including a nonlinear element having a nonlinear, time-varying characteristic $\varphi$, a first linear network having a frequency characteristic $A(\omega)$ connected to the input of said nonlinear element, a second linear network having a frequency characteristic $B(\omega)$ connected to the output of said nonlinear element, a third linear network having a frequency characteristic $C(\omega)$ connected in feedback relation to said nonlinear element, and a fourth linear network having a frequency characteristic $D(\omega)$ connected in parallel with the series connection of said first and second networks and said nonlinear element; means for limiting the frequency of signals from said signal distorting circuit to a frequency band $\Omega$; and signal recovery means comprising first network means for limited frequency signal from said distorting circuit and having a frequency characteristic $A(\omega)[D(\omega)]^{-1}$, a plurality of iterative stages, the first of said stages comprising second network means having a frequency characteristic $\{C(\omega)-A(\omega)[D(\omega)]^{-1}B(\omega)-1\}^{-1}$, means connecting the output of said first network means to said first stage; a plurality of intermediate stages each comprising an inverse nonlinear network having a nonlinear characteristic $\psi$ inverse to said nonlinear characteristic $\varphi$, means for applying the output of the next previous stage to said inverse nonlinear network, first combining means for combining the output of said previous stage, the output of said inverse nonlinear network, and the output of said first network means, third network means connected to said first combining means and having a frequency characteristic $\{C(\omega)-A(\omega)[D(\omega)]^{-1}B(\omega)-1\}^{-1}$ within the frequency band and a frequency characteristic $$[C(\omega)-1]^{-1}$$

outside of the frequency band $\Omega$, the output of said third network means comprising the output of that intermediate stage; a final stage comprising a further inverse nonlinear network having a nonlinear characteristic $\psi$ inverse to said nonlinear characteristic $\varphi$; means applying the output of the next to last stage to said inverse nonlinear network; second combining means for combining the outputs of said next to last stage, said further inverse nonlinear network and said first network means, and a fourth network means connected to said second combining means and having a frequency characteristic $\{C(\omega)-A(\omega)[D(\omega)]^{-1}B(\omega)-1\}^{-1}$ within the frequency band $\Omega$; fifth network means connected to said fourth network means and having a frequency characteristic $B(\omega)[D(\omega)]^{-1}$ within the frequency band $\Omega$; sixth network means for limited frequency signals from said distorting circuit and having a frequency characteristic $[D(\omega)]^{-1}$; and third combining means for combining the output of said fifth and sixth network means.

18. A signal translation system comprising a signal distorting circuit including a nonlinear element having a nonlinear, time-varying characteristic $\varphi$, a first linear network having a frequency characteristic $A(\omega)$ connected to the input of said nonlinear element, a second linear network having a frequency characteristic $B(\omega)$ connected to the output of said nonlinear element, a third linear network having a frequency characteristic $D(\omega)$ connected in parallel with the series connection of first and second network and said nonlinear element; means for limiting the frequency of signals from said signal distorting circuit to a frequency band $\Omega$; and signal recovery means comprising first network means for limited frequency signals from said distorting circuit and having a frequency characteristic $A(\omega)[D(\omega)]^{-1}$, a plurality of iterative stages, the first stage comprising second network means having a frequency characteristic $$\{A(\omega)[D(\omega)]^{-1}B(\omega)+1\}^{-1}$$

means connecting the output of said first network means to said first stage; a plurality of intermediate stages each comprising an inverse nonlinear network having a nonlinear characteristic $\psi$ inverse to said nonlinear characteristic $\varphi$, means for applying the output of the next previous stage to said inverse nonlinear network, first combining means for combining the output of said previous stage, the output of said inverse nonlinear network, and the output of said first network means, third network means connected to said first combining means and having a frequency characteristic $\{A(\omega)[D(\omega)]^{-1}B(\omega)+1\}^{-1}$ within the frequency band $\Omega$, the output of said third network means comprising the output of that stage; a final stage comprising a further inverse nonlinear network having a nonlinear characteristic $\psi$ inverse to said nonlinear characteristic $\varphi$, means for applying the output of the next to last stage to said further inverse nonlinear network, second combining means for combining the output of said next to last stage, said further inverse nonlinear network and said first network means, and fourth network means connected to said second combining means and having a frequency characteristic $$\{A(\omega)[D(\omega)]^{-1}B(\omega)+1\}^{-1}$$

within the frequency band $\Omega$; fifth network means connected to said fourth network means and having a frequency characteristic $B(\omega)[D(\omega)]^{-1}$ within the frequency band $\Omega$; sixth network means for limited frequency signals from said distorting circuit and having a frequency characteristic $[D(\omega)]^{-1}$; and third combining means for combining the outputs of said fifth and sixth network means.

19. A signal translation system comprising a signal distorting circuit including a nonlinear element having a nonlinear, time-varying characteristic $\varphi$, a first linear network having a frequency characteristic $A(\omega)$ connected to the input of said nonlinear element, a second linear network having a frequency characteristic $B(\omega)$ connected to the output of said nonlinear element, and a third linear network having a frequency characteristic $C(\omega)$ connected in feedback relation to said nonlinear element; means for limiting the frequency of signals from said signal distorting circuit to a frequency band $\Omega$; and signal recovery means comprising first network means for limited frequency signals from said distorting circuit and having a frequency characteristic $[B(\omega)]^{-1}$ within the frequency band $\Omega$, a plurality of iterative stages each comprising an inverse nonlinear network having a nonlinear characteristic $\Psi$ inverse to said nonlinear characteristic $\varphi$, first combining means for combining the output of said first network means and with the output of the next previous stage, if any, and applying the combination to said inverse nonlinear network, means for eliminating the frequency band $\Omega$ from the output of said inverse nonlinear network, second combining means for combining the output of said next previous stage, if any, and the frequency limited output of said inverse nonlinear network, and second network means connected to the output of said second combining means and having a frequency characteristic $[C(\omega)-1]^{-1}$ outside of the frequency band $\Omega$, the output of said second network means comprising the output of that stage; a further inverse nonlinear network having a nonlinear characteristic $\psi$ inverse to said nonlinear characteristic $\varphi$; third combining means for combining the output of the last stage with the output of said first network means and applying the combination to said further inverse nonlinear network; means for limiting the frequency range of the output of said further inverse nonlinear network to the frequency band $\Omega$; third network means for limited frequency signals from said further inverse nonlinear network and having a frequency characteristic $[A(\omega)]^{-1}$; fourth network means for limited frequency signals from said distorting circuit and having a frequency characteristic $[A(\omega)]^{-1}C(\omega)[B(\omega)]^{-1}$ within the frequency band $\Omega$; and fourth combining means for combining the outputs of said third and fourth network means.

20. A signal translation system comprising a signal distorting circuit including a nonlinear element having a nonlinear, time-varying characteristic $\varphi$, a first linear network having a frequency characteristic $A(\omega)$ connected to the input of said nonlinear element, and a second linear network having a frequency characteristic $B(\omega)$ connected to the output of said nonlinear element; means for limiting the frequency of signals from said signal distorting circuit to a frequency band $\Omega$; and signal recovery means comprising first circuit means for limited frequency signals from said distorting circuit and having a frequency characteristic $[B(\omega)]^{-1}$ within the frequency band $\Omega$, a plurality of iterative stages each comprising an inverse nonlinear network having a nonlinear characteristic $\psi$ inverse to said nonlinear characteristic $\varphi$, first combining means for combining the output of said first circuit means with the output of the next previous stage, if any, and applying the combination to said inverse nonlinear network, means for eliminating the frequency range $\Omega$ from the output of said inverse nonlinear network, second combining means for combining the limited frequency output of said inverse nonlinear network and the output of said next previous stage, if any, the output of said second combining means comprising the output of that stage; a further inverse nonlinear network having a nonlinear characteristic $\psi$ inverse to said nonlinear characteristic $\varphi$; third combining means for combining the output of said first network means with the output of the last stage and applying the combination to said further inverse nonlinear network; means for limiting the frequency range of the output of said further inverse nonlinear network to the frequency band $\Omega$; and second network means for limited frequency signals from said further inverse nonlinear network and having a frequency characteristic $[A(\omega)]^{-1}$ within the frequency band $\Omega$.

No references cited.

ARTHUR GAUSS, *Primary Examiner.*

J. ZAZWORSKY, *Assistant Examiner.*